No. 768,151. PATENTED AUG. 23, 1904.
J. W. SANDERSON.
ROTARY MOLDING MACHINE.
APPLICATION FILED APR. 1, 1904.
NO MODEL. 3 SHEETS—SHEET 3.

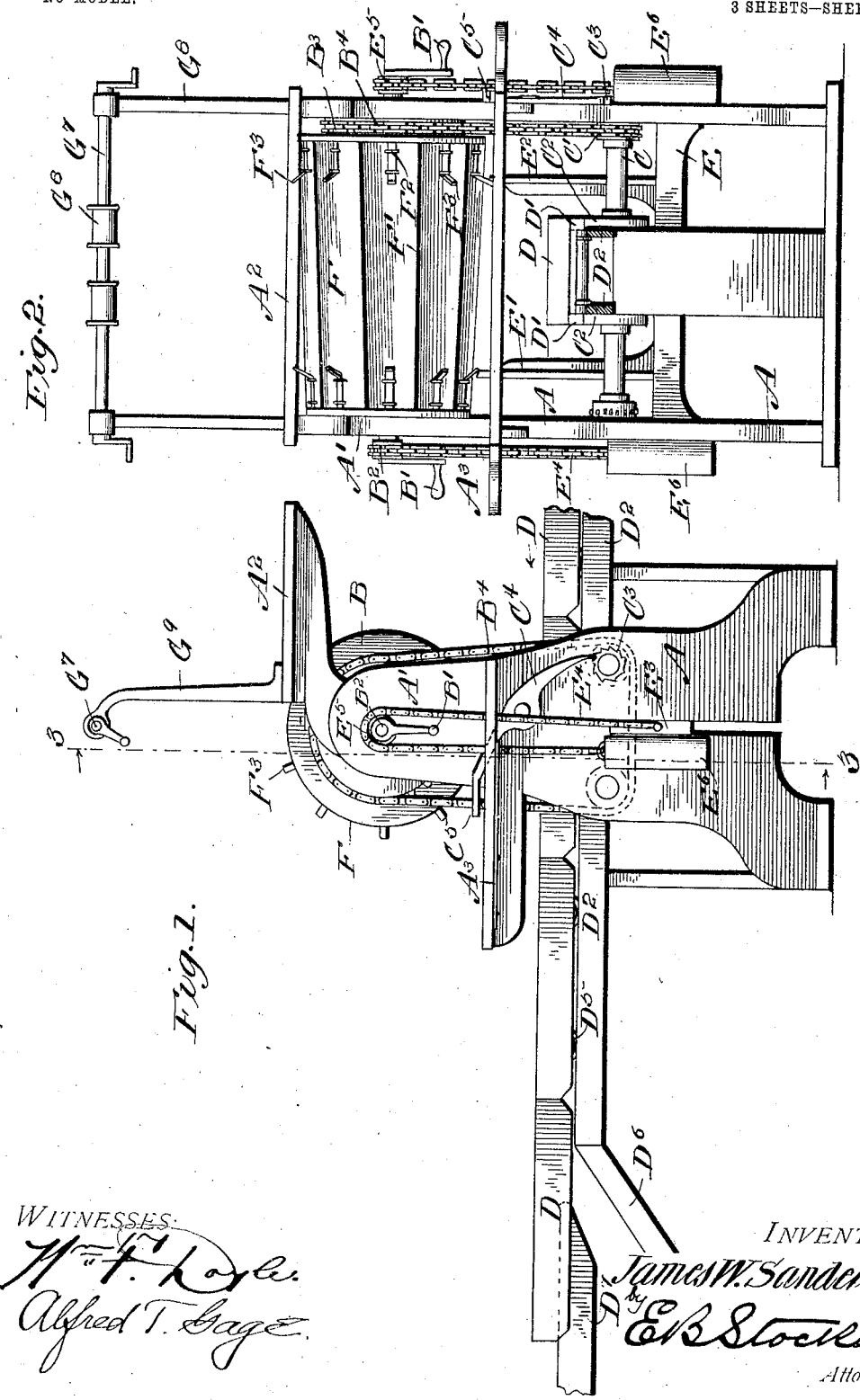

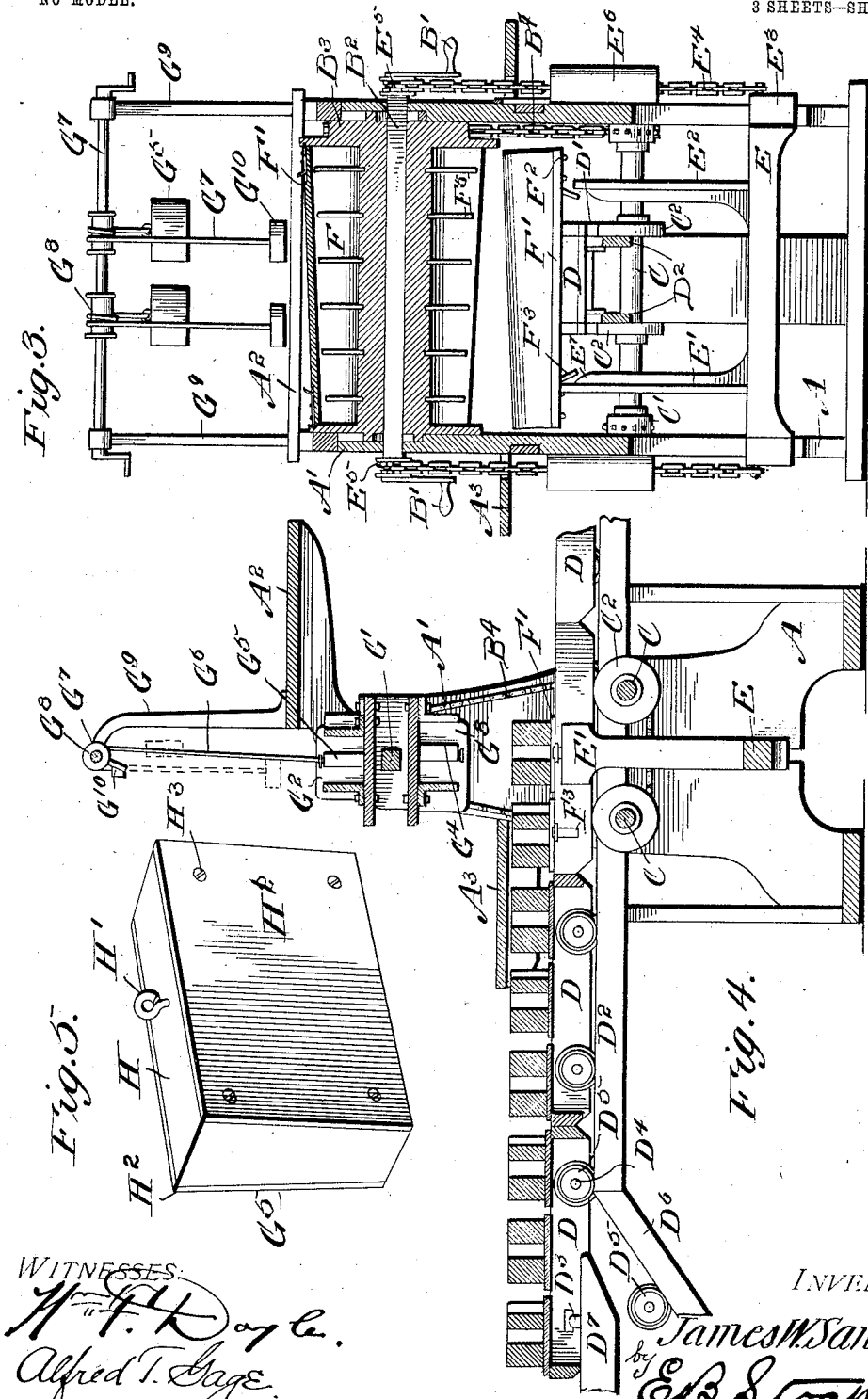

WITNESSES:
Wm F. Doyle
Alfred T. Gage

INVENTOR
James W. Sanderson
by E. B. Stocking
Attorney

No. 768,151.

Patented August 23, 1904.

UNITED STATES PATENT OFFICE.

JAMES W. SANDERSON, OF BURLINGTON, IOWA.

ROTARY MOLDING-MACHINE.

SPECIFICATION forming part of Letters Patent No. 768,151, dated August 23, 1904.

Application filed April 1, 1904. Serial No. 201,186. (No model.)

*To all whom it may concern:*

Be it known that I, JAMES W. SANDERSON, a citizen of the United States, residing at Burlington, in the county of Des Moines, State of Iowa, have invented certain new and useful Improvements in Rotary Molding-Machines, of which the following is a specification, reference being had therein to the accompanying drawings.

This invention relates to a rotary molding-machine, and particularly to a structure embodying a rotary mold from which the material is removed in its path of rotation.

The invention has for an object to provide a novel construction of parts for removing the molded material from the mold and placing it upon a car or carrier.

A further object of the invention is to provide means for feeding the carrier forward during the movement of the mold member, so as to be in proper position to receive a subsequent block when deposited thereon by the loading device which is also adapted to automatically release the pallet carrying the molded material from the rotary mold member.

Other and further objects and advantages of the invention will be hereinafter set forth and the novel features thereof defined by the appended claims.

Figure 6:
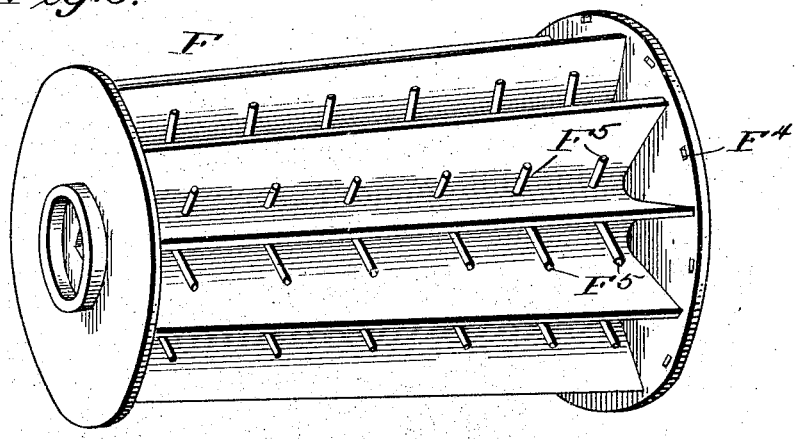
Figure 7:
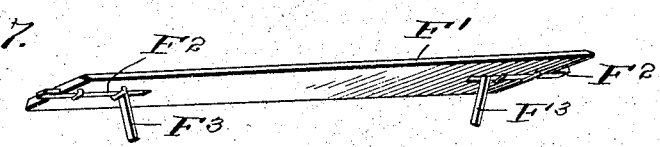

In the drawings, Figure 1 is an end elevation of the invention; Fig. 2, a side view thereof from the rear or delivery side; Fig. 3, a vertical section on the line 3 3 of Fig. 1; Fig. 4, a longitudinal section showing the application to the machine of a two-member mold for blocks; Fig. 5, a detail perspective of a removable core adapted for use with the machine; Fig. 6, a similar view of a mold-box for posts; Fig. 7, a detail perspective of a pallet acting as a cover for the post-mold, and Fig. 8 a similar view of the loading device adapted to engage the latches upon the pallet.

Like letters of reference refer to like parts in the several figures of the drawings.

The letter A designates the frame of the machine, which may be of any desired shape or configuration and which is provided with an upwardly-extending portion A', within which the mold member B is adapted to be journaled. This mold may be of any desired character having a plurality of mold-boxes thereon disposed relative to a central pivotal point. The material to be molded into the blocks may be introduced into the mold from a platform $A^2$ at one side of the upper portion of the machine, and the blocks thus molded are carried in the rotation of the mold member downward and past a controlling-platform $A^3$, upon which an operator stands for the purpose of controlling the mold B by means of a releasing-pawl $C^4$, applied to the shaft C below the mold. The term "block" herein used is intended to cover a molded article of any configuration or size whether the same be a post or a building-block. The mold member is provided at one end with a sprocket-wheel $B^3$, over which a chain $B^4$ is adapted to pass, said chain extending downward to a sprocket-wheel C' upon the shaft C, which carries friction-wheels $C^2$, adapted to drive a car or carrier D by contact with a depending or projecting portion D' thereof. This car or carrier is mounted to travel upon tracks or ways $D^2$, supported in any desired manner at opposite sides of the machine, and the car is also provided with a downwardly-opening journal-box $D^3$, Fig. 4, which loosely rests upon the axle $D^4$ of the truck having carrier-wheels $D^5$, which are provided with rubber or cushion tires to prevent jar of the molded material in the movement of the carrier. In the movement of the car at the delivery side of the machine these trucks are adapted to be removed from the car-frame, which may then be used as a drying-platform, and this may be accomplished in any desired manner—for instance, by means of a deflected portion $D^6$ of the track $D^2$, along which the wheels $D^5$ may travel, while the body of the carrier may be supported upon a frame $D^7$.

From the structure so far described it will be seen that a rotation of the mold transmits motion through the chain $B^4$ to the carrier-moving shaft C, which moves the carrier forward to present a new surface for receiving the next block removed from the mold. The rotation of these shafts C and also of the mold may be controlled by means of a ratchet-wheel $C^3$, carried upon the end of one of the shafts and adapted to engage a pawl $C^4$, pivotally mounted at the side of the machine and provided with a pressure-head C⁵ convenient to the foot of the operator.

The carrier-loading device E is disposed beneath the mold and provided with upwardly-extending arms E' and E², while the free ends E³ thereof are provided with sprocket-chains E⁴, extending upward and over a wheel E⁵ rotatable upon the shaft B² of the mold and having a handle B', while its opposite end is provided with a counterbalancing-weight E⁶, by which the loading device is retained in its adjusted position and the operation thereof rendered easy.

Figure 8:
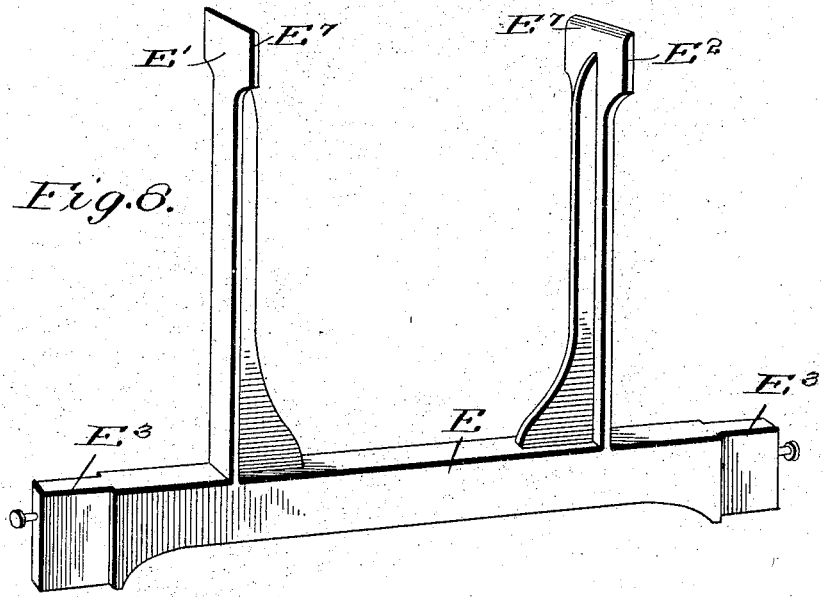

As showing one form of mold adapted for application to the machine, a post-mold F is shown in Figs. 1, 2, and 3 and in detail in Fig. 6, which is provided with a series of molding-boxes adapted to be closed by means of pallets F', (see Fig. 7,) which are provided at opposite ends with sliding latches F², having angularly-disposed ends F³, adapted to be engaged by the upper ends of the arms E' and E², carried by the loading device E, these ends being suitably curved, as shown at E⁷ in Fig. 8, so as to slide the latches and permit the pallet to rest upon the ends of the arms. The post-mold F is provided at its ends with suitable pockets F⁴ to receive these latches, and if it be desired that a fence-post or other post molded therein have transversely-extended holes therethrough for the purpose of introducing wires the same may be accomplished by a series of fixed pins F⁵, disposed in each of the mold-pockets which form cores for that purpose. It will be noticed that the form of mold for posts tapers longitudinally, having a slight conical form, and for the purpose of accommodating the carrier-loading device to the under face of the pallet carried by this mold the arm E' thereof is of slightly-greater length than the arm E²; but if used in connection with a mold of other shape the arms can be altered to correspond thereto.

In Fig. 4 a modified form of mold G, especially adapted for building-blocks, is illustrated, which has the central shaft G' thereof rotatably mounted in the portions A' of the frame. This mold G is provided with two oppositely-disposed mold-boxes G² and G³, the latter of which is shown as provided with a core G⁴, secured within the box, while the former is provided with a removable core G⁵, suspended from a cord or chain G⁶, passing over a suitable drum G⁷, carried by a shaft G⁸, mounted in standards G⁹, the free end of said cord G⁶ being provided with a counterbalancing-weight G¹⁰. The core G⁵ is formed so as to be of an adjustable character for different sizes of molds as regards the width thereof, and for this purpose the central block H of the core, which is preferably of wood and provided with an attaching device H' for the cord, is tapered downwardly, as shown in Fig. 5, and has applied to its opposite sides contact-plates H², preferably of metal, which may be secured in position in any desired manner—for instance, by means of screws H³. When it is desired to vary the width of the core, its plates are removed and a center of less diameter inserted between the plates.

In the operation of the invention one of the empty mold-boxes adjacent to the platform above the rotary mold is filled with the material from which the block or molded article is to be formed. This material is properly tamped into the mold and the pallet or cover then applied thereto, when the loaded boxes being on one side of the mold will cause the same to rotate, so as to bring the next empty box at the edge of the filling-platform. The operator upon the lower platform controls the rotation of the machine by the locking-pawl, so that motion may be transmitted from the rotary mold to the car-moving rollers at the sides of the track and the car or carrier thus moved forward a sufficient distance to present a clear space upon the carrier for depositing the next molded block. The loading action is performed by means of the arms, which are raised by the handle and sprocket carried thereby until they contact with the finger-pieces from the pallet-latches, thus automatically withdrawing the latches and supporting the pallet and molded article thereon. The loading device is then lowered to the position shown in Fig. 3, so as to deposit the pallet with a block thereon upon the upper surface of the carrier. This carrier is provided with the cushioned wheels to obviate any jarring or vibration of the block while in an unset condition, while the trucks and wheels are adapted to be removed from beneath the carrier, as shown in Fig. 5, so that they can be applied to a subsequent car. The carriers having the blocks may then be removed to any desired place for the purpose of drying the same. It will be observed that the filled mold-boxes are disposed upon one side of the rotary mold. When a post-mold is used, as shown in Fig. 6, the core-blocks are retained in a raised position above the mold-box; but when a block such as used for building purposes is to be formed these cores may be lowered into the mold, as shown in Fig. 5, and withdrawn therefrom after the material has sufficiently set, when the pallet is applied and the mold rotated, as before described. It will be observed that the loading device, as well as the core-blocks, are counterbalanced, so as to render their operation easily effected by an attendant, while the core-block itself is adapted to be adjusted in thickness by means of the removable side plates. The form of car provided also permits the use of the same as a drying or curing platform, as the trucks of the car are adapted to be removed and used with a subsequent car, thus materially reducing the equipment necessary for a plant of any fixed capacity.

It is obvious that changes may be made in the details of construction and configuration without departing from the spirit of the invention as defined by the appended claims.

Having described my invention and set forth its merits, what I claim, and desire to secure by Letters Patent, is—

1. In a molding-machine, a rotary mold, a reciprocating loading device beneath the mold, and means for moving said device radially toward and from the axis of rotation of the mold.

2. In a molding-machine, a rotary mold, a reciprocating loading device beneath the mold, means for moving said device radially toward and from the axis of rotation of the mold, and a movable carrier disposed in the path of the loading device to move laterally thereto and receive the article therefrom.

3. In a molding-machine, a rotary mold, a loading device beneath the mold, means for moving said device toward and from the mold, a movable carrier disposed in the path of the loading device to receive the article therefrom, a pallet forming a cover to the mold-box, and means for automatically releasing said pallet by the contact of the loading device therewith.

4. In a molding-machine, a rotary mold, a loading device beneath the mold, means for moving said device toward and from the mold, a movable carrier disposed in the path of the loading device to receive the article therefrom, a pallet forming a cover to the mold-box, means for automatically releasing said pallet by the contact of the loading device therewith, and means for moving said carrier simultaneously with the rotation of said mold.

5. In a molding-machine, a rotary mold, a loading device beneath the mold, means for moving said device toward and from the mold, a movable carrier disposed in the path of the loading device to receive the article therefrom, a pallet forming a cover to the mold-box, means for automatically releasing said pallet by the contact of the loading device therewith, means for moving said carrier simultaneously with the rotation of said mold, and means for controlling the rotation of said mold and carrier.

6. In a molding-machine, a rotary mold, a loading device beneath the mold, means for moving said device toward and from the mold, a movable carrier disposed in the path of the loading device to receive the article therefrom, a pallet forming a cover to the mold-box, means for automatically releasing said pallet by the contact of the loading device therewith, means for moving said carrier simultaneously with the rotation of said mold, means for controlling the rotation of said mold and carrier, and means for counterbalancing said loading device.

7. In a molding-machine, a rotary mold, a cover-plate therefor having securing means, a carrier below the mold, a reciprocatory molding device beneath said mold, and means carried by said device to release the plate-securing means.

8. In a molding-machine, a rotary mold, a platform above the same, a platform below the mold, a reciprocatory loading device beneath said mold, means independent of the mold for operating said loading device, arms carried by said loading device, a track or way disposed between said arms, and a movable carrier disposed upon said track or way.

9. In a molding-machine, a rotary mold, a platform above the same, a platform below the mold, a reciprocatory loading device beneath said mold, arms carried by said loading device, a track or way disposed between said arms, a movable carrier disposed upon said track or way, driving-wheels adjacent to said track to engage said carrier, and means for rotating the same from said mold for moving the carrier.

10. In a molding-machine, a rotary mold, a platform above the same, a platform below the mold, a reciprocatory loading device beneath said mold, arms carried by said loading device, a track or way disposed between said arms, a movable carrier disposed upon said track or way, driving-wheels adjacent to said track to engage said carrier, and means for rotating the same for moving the carrier comprising a driving connection extending from the shaft of said wheel to the hub of said rotary mold.

11. In a molding-machine, a rotary mold, a platform above the same, a platform below the mold, a reciprocatory loading device beneath said mold, arms carried by said loading device, a track or way disposed between said arms, a movable carrier disposed upon said track or way, driving-wheels adjacent to said track, means for rotating the same for moving the carrier comprising a driving connection extending to the hub of said rotary mold, a pallet provided with latches engaging the opposite ends of the mold-box to form a cover therefor, angularly-disposed fingers carried by said latches and adapted to be engaged and moved by the ends of the arms carried by the loading device, and means for moving and guiding said loading device.

12. In a molding-machine, a rotary mold having a plurality of boxes, a standard adjacent to said mold and provided with a rotatable shaft, and a core carried by said shaft to be inserted and withdrawn from the boxes to said mold.

13. In a molding-machine, a rotary mold having a plurality of boxes, a standard adjacent to said mold and provided with a rotatable shaft, a core carried by said shaft to be inserted and withdrawn from the boxes to said mold, means for counterbalancing said core, and means for varying the thickness thereof.

14. In a molding-machine, a mold, a carrier disposed to receive material therefrom, traction-wheels removably mounted upon said carrier, and means for removing the wheels from said carrier by a downward movement therefrom.

15. In a molding-machine, a mold, a carrier disposed to receive material therefrom and having a bearing open at its lower end, traction-wheels for said carrier-bearing, and means for removing the wheels from said carrier comprising a deflected portion of the track to permit a downward movement of the wheels and axles from the carrier.

16. In a molding-machine, a mold, a carrier for receiving material therefrom, traction-wheels upon said carrier, a driving-wheel disposed to engage a portion of said carrier, and means for imparting an intermittent motion to said driving-wheel.

17. In a molding-machine, a mold, a carrier for receiving material therefrom, traction-wheels upon said carrier, a driving-wheel disposed to engage a portion of said carrier, means for imparting an intermittent motion from the mold to said driving-wheel, and a cushioned tire upon the wheels of said carrier.

18. In a molding-machine, a rotary mold having a series of radially-disposed boxes extending parallel to the axis thereof and from end to end of the mold, means for closing the open side of said boxes, and a loading device having means for automatically releasing said closing means.

19. In a molding-machine, a mold comprising a plurality of boxes, a pallet having sliding latches at the opposite ends to engage the ends of the mold, and a driving-wheel carried by the end of the mold for transmitting motion therefrom.

20. In a molding-machine, a mold comprising a plurality of boxes, a pallet having sliding latches at the opposite ends to engage the ends of the mold, a driving-wheel carried by the end of the mold for transmitting motion therefrom, and a loading device having parallel fingers adapted in their travel toward the mold to engage and move the pallet-latches.

21. In a molding-machine, a rotary mold, a track beneath the same, a carrier upon said track, a driving-wheel adapted to engage said carrier, and a driving-chain extending from the shaft of the mold to said driving-wheel.

22. In a molding-machine, a rotary mold, a track beneath the same, a carrier upon said track, a driving device adapted to engage said carrier, a driving-chain extending from the mold to said device, and a pawl and latch to control the movement of said mold and driving device.

23. In a molding-machine, a rotary mold, a track beneath the same, a carrier upon said track, a driving device adapted to engage said carrier, a driving-chain extending from the mold to said device, a pawl and latch to control the movement of said mold and driving device, a loading device mounted to reciprocate in the frame of the machine, a sprocket-wheel provided with an operating-handle, a chain extending from the loading device over said wheel, and a counterbalancing-weight at the free end of said chain.

24. In a molding-machine, a rotary mold, a track beneath the same, a carrier upon said track, a driving device adapted to engage said device, a driving-chain extending from the mold to said carrier, a pawl and latch to control the movement of said mold and driving device, a loading device mounted to reciprocate in the frame of the machine, a sprocket-wheel provided with an operating-handle, a chain extending from the loading device over said wheel, a counterbalancing-weight at the free end of said chain, arms carried by said loading device, and pallets provided with latches to be engaged and released by said arms.

In testimony whereof I affix my signature in presence of two witnesses.

JAMES W. SANDERSON.

Witnesses:
SELVA ENBURG,
H. E. HAWLEY.